United States Patent
Kim et al.

(10) Patent No.: US 8,942,979 B2
(45) Date of Patent: Jan. 27, 2015

(54) ACOUSTIC PROCESSING APPARATUS AND METHOD

(75) Inventors: Nam-Hoon Kim, Yongin-si (KR); Jeong-Su Kim, Yongin-si (KR); Jeong-Mi Cho, Seongnam-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 506 days.

(21) Appl. No.: 13/192,902

(22) Filed: Jul. 28, 2011

(65) Prior Publication Data

US 2012/0173232 A1 Jul. 5, 2012

(30) Foreign Application Priority Data

Jan. 4, 2011 (KR) ........................ 10-2011-0000576

(51) Int. Cl.
G10L 15/06 (2013.01)
G10L 15/08 (2006.01)
G10L 15/065 (2013.01)

(52) U.S. Cl.
CPC ............... *G10L 15/08* (2013.01); *G10L 15/065* (2013.01)
USPC ........................................................ 704/245

(58) Field of Classification Search
None
See application file for complete search history.

(56) References Cited

U.S. PATENT DOCUMENTS

| | | | |
|---|---|---|---|
| 6,230,138 B1 * | 5/2001 | Everhart ...................... 704/275 |
| 7,031,917 B2 | 4/2006 | Asano | |
| 7,050,550 B2 * | 5/2006 | Steinbiss et al. ........... 379/88.01 |
| 7,099,822 B2 * | 8/2006 | Zangi ............................ 704/226 |
| 7,224,981 B2 * | 5/2007 | Deisher et al. ............. 455/456.1 |
| 7,321,853 B2 * | 1/2008 | Asano .......................... 704/238 |
| 7,475,014 B2 * | 1/2009 | Smaragdis et al. ........... 704/250 |
| 8,290,773 B2 * | 10/2012 | Washio ........................ 704/243 |
| 8,468,012 B2 * | 6/2013 | Lloyd et al. ...................... 704/8 |
| 2004/0138882 A1 * | 7/2004 | Miyazawa .................... 704/233 |
| 2008/0208592 A1 * | 8/2008 | Cross et al. ................... 704/275 |
| 2009/0018828 A1 * | 1/2009 | Nakadai et al. ............... 704/234 |
| 2009/0138263 A1 * | 5/2009 | Shozakai et al. ............. 704/243 |

OTHER PUBLICATIONS

Rabiner, Lawrence. "A tutorial on hidden Markov models and selected applications in speech recognition." Proceedings of the IEEE 77.2 (1989): 257-286.*

Gales, Mark JF. "Cluster adaptive training of hidden Markov models." Speech and Audio Processing, IEEE Transactions on 8.4 (2000): 417-428.*

Takashima, Ryoichi, Tetsuya Takiguchi, and Yasuo Ariki. "Single-channel multi-talker-localization based on maximum likelihood." Statistical Signal Processing, 2009. SSP'09. IEEE/SP 15th Workshop on. IEEE, 2009.*

(Continued)

*Primary Examiner* — Brian Albertalli
(74) *Attorney, Agent, or Firm* — NSIP Law

(57) ABSTRACT

An acoustic processing apparatus is provided. The acoustic processing apparatus including a first extracting unit configured to extract a first acoustic model that corresponds with a first position among positions set in a speech recognition target area, a second extracting unit configured to extract at least one second acoustic model that corresponds with, respectively, at least one second position in proximity to the first position, and an acoustic model generating unit configured to generate a third acoustic model based on the first acoustic model, the second acoustic model, or a combination thereof.

20 Claims, 4 Drawing Sheets

(56) References Cited

OTHER PUBLICATIONS

Wang, Longbiao, Norihide Kitaoka, and Seiichi Nakagawa. "Robust distant speech recognition by combining position-dependent CMN with conventional CMN." Acoustics, Speech and Signal Processing, 2007. ICASSP 2007. IEEE International Conference on. vol. 4. IEEE, 2007.*

Hu, Jwu-Sheng, Chieh-Cheng Cheng, and Wei-Han Liu. "A robust statistical-based speakers location detection algorithm in a vehicular environment." EURASIP Journal on Applied Signal Processing 2007.1 (2007): 181-181.*

Smaragdis, Paris, and Petros Boufounos. "Position and trajectory learning for microphone arrays." Audio, Speech, and Language Processing, IEEE Transactions on 15.1 (2007): 358-368.*

Hu, Jwu-Sheng, Chieh-Cheng Cheng, and Wei-Han Liu. "Robust speaker's location detection in a vehicle environment using GMM models." Systems, Man, and Cybernetics, Part B: Cybernetics, IEEE Transactions on 36.2 (2006): 403-412.*

Takiguchi, Tetsuya, Satoshi Nakamura, and Kiyohiro Shikano. "HMM-separation-based speech recognition for a distant moving speaker." Speech and Audio Processing, IEEE Transactions on 9.2 (2001): 127-140.*

Takiguchi, Tetsuya, et al. "Model adaptation based on HMM decomposition for reverberant speech recognition." Acoustics, Speech, and Signal Processing, 1997. ICASSP-97., 1997 IEEE International Conference on. vol. 2. IEEE, 1997.*

Wang, Longbiao, Norihide Kitaoka, and Seiichi Nakagawa. "Robust distant speaker recognition based on position-dependent CMN by combining speaker-specific GMM with speaker-adapted HMM." Speech communication 49.6 (2007): 501-513.*

Huang et al., "Effective Acoustic Adaption for a Distant-talking Interactive TV System," Interspeech, 2008, pp. 1-4.

Yamada et al., "Distant-Talking Speech Recognition Based on a 3-D Viterbi Search Using a Microphone Array," *IEEE Transactions on Speech and Audio Processing*, vol. 10, No. 2, Feb. 2002, pp. 48-56.

* cited by examiner

ACOUSTIC PROCESSING APPARATUS AND METHOD

CROSS-REFERENCE TO RELATED APPLICATION(S)

This application claims the benefit under 35 U.S.C. §119 (a) of Korean Patent Application No. 10-2011-0000576, filed on Jan. 4, 2011, in the Korean Intellectual Property Office, the entire disclosure of which is incorporated herein by reference for all purposes.

BACKGROUND

1. Field

The following description relates to an acoustic processing apparatus and method.

2. Description of the Related Art

With the distribution of various types of devices, diverse methods to conveniently control such devices have been suggested.

For example, a speech recognition based user interface (UI) that allows a user to control devices by speech has gained interest. A general speech recognition based UI is manufactured under the condition of a short distance between a user and a microphone. Thus, in a case where a microphone is placed in remote from a user, it is difficult for the speech recognition based UI to accurately recognize speech. In other words, as a distance between the user and the microphone increases, the speech recognition performance deteriorates due to environmental effects such as echo, reverberation, etc.

Hence, various research has been carried out on techniques for accurately recognizing a speech even when a microphone is distant from a user.

SUMMARY

In one general aspect, an acoustic processing apparatus includes a first extracting unit configured to extract a first acoustic model that corresponds with a first position among positions set in a speech recognition target area, a second extracting unit configured to extract at least one second acoustic model that corresponds with, respectively, at least one second position in proximity to the first position, and an acoustic model generating unit configured to generate a third acoustic model based on the first acoustic model, the second acoustic model, or a combination thereof.

The acoustic model generating unit may generate the third acoustic model by assigning a weight to the first acoustic model, the second acoustic model, or a combination thereof and performing a linear combination.

The acoustic model generating unit may generate acoustic models which correspond with the respective set positions based on experiment data obtained from each of the set positions.

The acoustic processing apparatus may further include a position detecting unit configured to detect position information of a user, and to detect the first position based on the detected user's position information.

The acoustic processing apparatus may further include a speech recognition unit configured to recognize an acoustic signal received from the first position based on the third acoustic model.

The first position may be a closest position to a user among the positions set in the speech recognition target area.

The third acoustic model may be generated based on the linear combination of the first acoustic model and the second acoustic model.

Each second position may be adjacent to the first positions set in the speech recognition area.

The at least one second position may include a portion of positions directly adjacent to the first position.

In another general aspect, an acoustic processing method of an acoustic processing apparatus based on position information is provided. The acoustic processing method includes extracting a first acoustic model that corresponds with a first position among positions set in a speech recognition target area, extracting at least one second acoustic model that corresponds with, respectively, at least one second position in proximity to the first position, and generating a third acoustic model based on the first acoustic model, the second acoustic model, or a combination thereof.

The generating of the third acoustic model may include generating the third acoustic model based on assigning a weight to the first acoustic model, the second acoustic model, or a combination thereof and performing a linear combination.

The acoustic processing method may further include generating acoustic models which correspond with the respective set positions based on experiment data obtained from each of the set positions.

The acoustic processing method may further include extracting position information of a user, and extracting the first position based on the detected user's position information.

The acoustic processing method may further include recognizing an acoustic signal received from the first position based on the third acoustic model.

In yet another general aspect, an acoustic processing apparatus is provided. The acoustic processing apparatus includes a first extracting unit configured to extract a first acoustic model that corresponds with a first position among positions set in a speech recognition target area, a second extracting unit configured to extract at least one second acoustic model that corresponds with, respectively, at least one second position, each second position being adjacent to the first position among the positions set in the speech recognition target area, an acoustic model generating unit configured to generate a third acoustic model based on the first acoustic model, the second acoustic model, or a combination thereof, and a speech recognition unit configured to recognize an acoustic signal based on the third acoustic model.

Other features and aspects may be apparent from the following detailed description, the drawings, and the claims.

Figure 1:
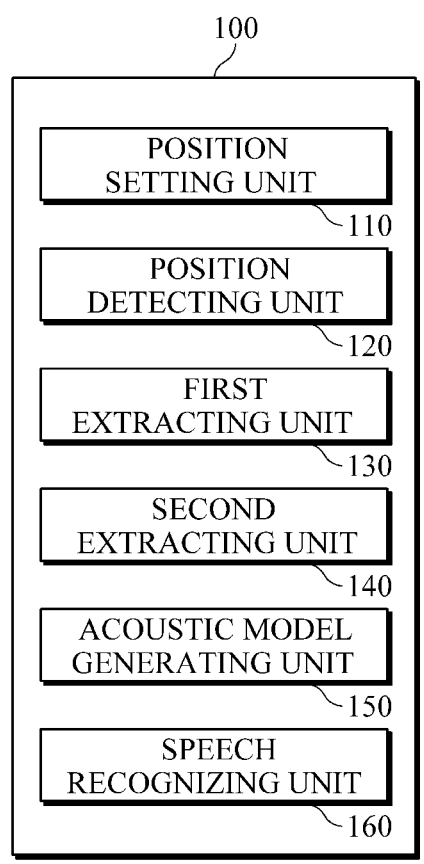
FIG. 1 is a diagram illustrating an example of an acoustic processing apparatus.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

The following description is provided to assist the reader in gaining a comprehensive understanding of the methods, apparatuses, and/or systems described herein. Accordingly, various changes, modifications, and equivalents of the methods, apparatuses, and/or systems described herein will be suggested to those of ordinary skill in the art. Also, descriptions of well-known functions and constructions may be omitted for increased clarity and conciseness.

FIG. 1 illustrates an example of an acoustic processing apparatus.

Referring to the example illustrated in FIG. 1, the acoustic processing apparatus 100 may include a position setting unit 110, a position detecting unit 120, a first extracting unit 130, a second extracting unit 140, an acoustic model generating unit 150, and a speech recognizing unit 160.

The position setting unit 110 may set a plurality of positions, for example, M*N positions, in a speech recognition target area.

The acoustic model generating unit 150 may generate acoustic models which correspond with the respective set positions based on experiment data obtained from the set positions. Each acoustic model may represent at least one characteristic of a speech signal. For example, the acoustic model may store at least one phoneme and speech characteristic information corresponding with each phoneme. For example, an acoustic model may be a hidden Markov model (HMM). The experiment data may be obtained by reproducing a speech signal at a predefined location, or by an artificial mouth that measure voice call quality. For example, the acoustic model generating unit 150 may generate an acoustic model that is suitable to a relevant location based on, for example, a maximum likelihood (ML) scheme.

The position detecting unit 120 may detect position information of a user, and may detect a first position set by the position setting unit 110 based on the detected position information of the user. The position information of the user may be detected by various devices for position detection. The first position may refer to a position that is matched with position information of the user among the plurality of set positions in the speech recognition target area. In a case in which no set position precisely corresponds with the position information of the user, the position detecting unit 120 may detect a position that most closely corresponds with the detected position information of the user as the first position.

The first extracting unit 130 may extract a first acoustic model which corresponds with the first position.

The second extracting unit 140 may extract at least one second acoustic model that corresponds with at least one second position in proximity to the first position.

The acoustic model generating unit 150 may generate a third acoustic model which corresponds with the first position based on the first acoustic model, the second acoustic model, or a combination thereof. For example, the acoustic model generating unit 150 may generate the third acoustic model by assigning a weight to the first acoustic model, the second acoustic model, or a combination thereof and performing a linear combination. For example, the acoustic model generating unit 150 may use a cluster adaptive training scheme to generate the third acoustic model. In other words, the acoustic model generating unit 150 may generate the third acoustic model reflecting the environmental characteristics of the first position based on the first acoustic model, the second acoustic model, or a combination thereof. The acoustic model generating unit 150 may generate a new acoustic model for each set position based on procedures described above. A method of generating an acoustic model will be described later with reference to FIG. 2.

The speech recognition unit 160 may recognize a speech signal received from the first position based on the third acoustic model generated by the acoustic model generating unit 150. As a result that the third acoustic model relates to the environmental characteristics of the first position, the speech recognizing unit 160 may be enabled to process and recognize the received speech signal more accurately than without being based on the third acoustic model.

The acoustic processing apparatus may generate a third acoustic model which corresponds with a position of the user each time a user's position information is extracted, and may process and recognize a speech signal based on the generated third acoustic model.

In another example, the acoustic processing apparatus may generate third acoustic models that correspond with, respectively, set positions, and then process and recognize a speech signal based on a third acoustic model that corresponds with an extracted user's current information among the generated third acoustic models. In other words, the acoustic processing apparatus may generate a third acoustic model in real time or in advance.

The acoustic processing apparatus may generate an acoustic model that reflects the environmental characteristics of a position corresponding to a user's position based on other acoustic models which correspond to a position that is set corresponding to the user's position and a position in proximity to the set position, and the acoustic processing apparatus may process an input speech signal using the generated acoustic model, so that the speech signal may be accurately processed and recognized even in response to a wrong acoustic model being selected due to errors in detecting the user's position.

Figure 2:
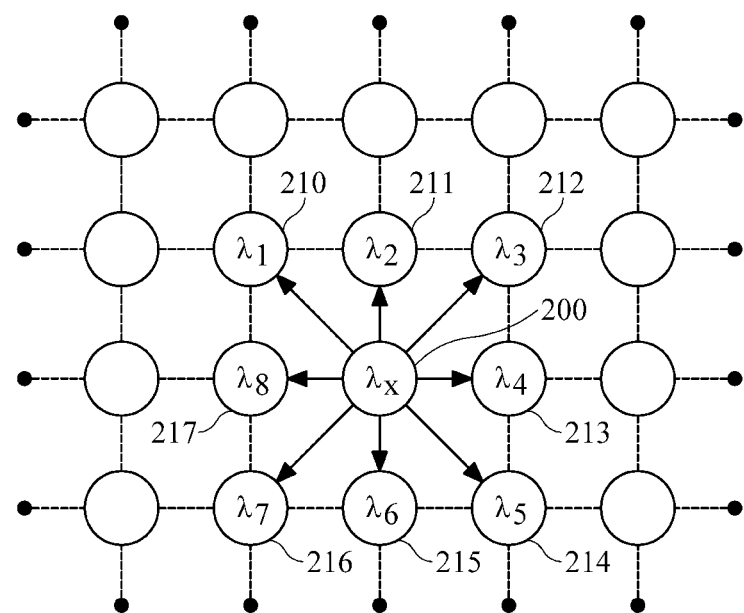
FIG. 2 is a diagram illustrating an example for generating an acoustic model based on an acoustic processing apparatus shown in FIG. 1.

FIG. 2 illustrates an example for generating an acoustic model based on the acoustic processing apparatus shown in FIG. 1.

Referring to FIGS. 1 and 2, the position setting unit 110 may set 5*4(=20) positions in a speech recognition target area.

The position detecting unit 120 may detect position information of a user, and may detect a first position 200 based on the detected user's position information. The first position 200 refers to a position that corresponds with the detected user's position information among the set positions.

The second detecting unit 140 may extract second acoustic models $\lambda_1$, $\lambda_2$, $\lambda_3$, $\lambda_4$, $\lambda_5$, $\lambda_6$, $\lambda_7$, and $\lambda_8$ which correspond with, respectively, second positions 210, 211, 212, 213, 214, 215, 216, and 217 in proximity to the first position 200. Hereinafter, the acoustic model will be represented by $\lambda$.

In this non-limiting example, the second extracting unit 140 extracts 8 second positions. However, the number of second positions is not limited thereto and may be more than 8 or less than 8, and the second extracting unit 140 may extract a second acoustic model that corresponds with at least one second position in proximity to the first position 200. For example, the second extracting unit 140 may extract four second acoustic models $\lambda_1$, $\lambda_3$, $\lambda_5$, and $\lambda_7$ which correspond with, respectively, four second positions 210, 212, 214, and 216 in proximity to the first position 200.

The acoustic model generating unit 150 may generate a third acoustic model $\lambda x$, which corresponds with the first position 200, based on the second acoustic models $\lambda_1$, $\lambda_2$, $\lambda_3$, $\lambda_4$, $\lambda_5$, $\lambda_6$, $\lambda_7$, and $\lambda_8$. For example, the acoustic model generating unit 150 may assign a weight to each of the second acoustic models $\lambda_1$, $\lambda_2$, $\lambda_3$, $\lambda_4$, $\lambda_5$, $\lambda_6$, $\lambda_7$, and $\lambda_8$ and may perform a linear combination to generate the third acoustic models $\lambda x$. The third acoustic model $\lambda x$ may be generated based on Equation 1 below.

$$\lambda x = w1*\lambda 1 + w2*\lambda 2 + w3*\lambda 3 + w4*\lambda 4 + w5*\lambda 5 + w6*\lambda 6 + w7*\lambda 7 + w8*\lambda 8 \quad (1)$$

Here, each of $\lambda_1$, $\lambda_2$, $\lambda_3$, $\lambda_4$, $\lambda_5$, $\lambda_6$, $\lambda_7$, and $\lambda_8$ represents a second acoustic model, $\lambda x$ represents a third acoustic model, and w represents a weight.

The third acoustic model $\lambda x$ may be generated by multiplying each second acoustic model $\lambda_1$, $\lambda_2$, $\lambda_3$, $\lambda_4$, $\lambda_5$, $\lambda_6$, $\lambda_7$, and $\lambda_8$ by a weight and performing a linear combination on the weighted second models.

Equation 1 is only an example, and the acoustic model generating unit 150 may generate a third acoustic model by using various methods including, for example, assigning a weight to only some second acoustic models, and performing a linear combination.

In another example, the acoustic model generating unit 150 may generate twenty (20) acoustic models corresponding to a respective twenty set positions according to the procedures described above.

Figure 3:
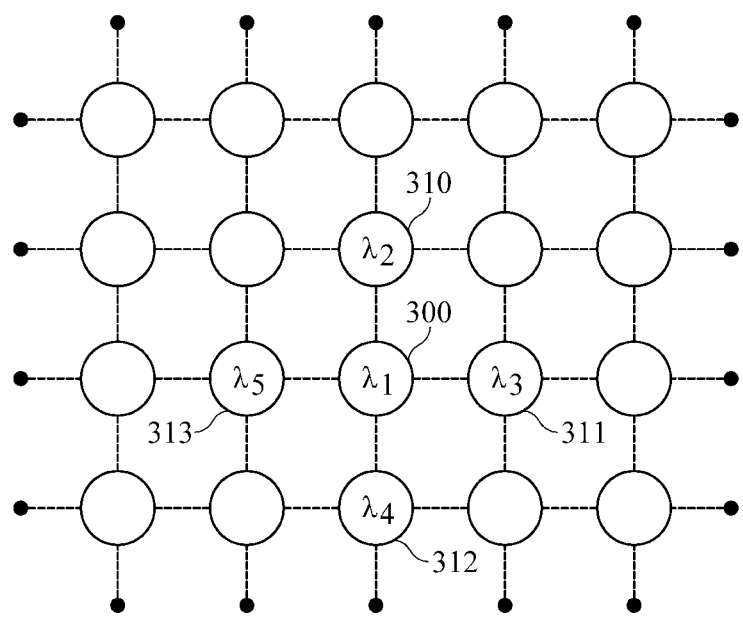
FIG. 3 is a diagram illustrating another example for generating an acoustic model based on the acoustic processing apparatus illustrated in FIG. 1.

FIG. 3 illustrates another example for generating an acoustic model by the acoustic processing apparatus illustrated in FIG. 1.

Referring to FIGS. 1 and 3, the position setting unit 110 may set 5*4 (=20) positions in a speech recognition target area.

The position detecting unit 120 may detect position information of a user, and detect a first position 300 based on the detected user's position information. The first position 300 refers to a position which corresponds with the user's position information among the set positions.

The first extracting unit 130 may extract a first acoustic model $\lambda_1$ which corresponds with the first position 300 among the positions set in the speech recognition target area.

The second extracting unit 140 may extract second acoustic models $\lambda_2$, $\lambda_3$, $\lambda_4$, and $\lambda_5$ which corresponds with, respectively, second positions 310, 311, 312, and 313 in proximity to the first position 300.

Although the example illustrated in FIG. 3 is described under the assumption that the second extracting unit 140 extracts the second acoustic models $\lambda_2$, $\lambda_3$, $\lambda_4$, and $\lambda_5$ which correspond with the second positions 310, 311, 312, and 313, the second extracting unit 140 may extract at least one second acoustic model that corresponds with at least one second position in proximity to the first position. For example, the second extracting unit 140 may extract two second acoustic models $\lambda_2$, and $\lambda_4$ which are matched with the respective second positions 310 and 312 in proximity to the first position 300.

The acoustic model generating unit 150 may generate a third acoustic model $\lambda x$ that is matched with the first position 300 based on the first acoustic model $\lambda_1$ and the second acoustic models $\lambda 2$, $\lambda 3$, $\lambda 4$, and $\lambda 5$. For example, the acoustic model generating unit 150 may generate the third acoustic model $\lambda x$ by assigning a weight to the first acoustic model $\lambda 1$ and the second acoustic models $\lambda 2$, $\lambda 3$, $\lambda 4$, and $\lambda 5$ and performing a linear combination. The third acoustic model $\lambda x$ may be generated as represented as Equation 2 below.

$$\lambda x = w1*\lambda 1 + w2*\lambda 2 + w3*\lambda 3 + w4*\lambda 4 + w5*\lambda 5 \quad (2),$$

where $\lambda$ represents an acoustic model, and w represents a weight.

$\lambda_1$ represents the first acoustic model, $\lambda_2$, $\lambda_3$, $\lambda_4$, and $\lambda_5$ represent the second acoustic models, and $\lambda x$ represents the third acoustic model.

Equation 2 is an example, and the acoustic model generating unit 150 may generate a third acoustic model by using various methods such as, for example, assigning a weight to some second acoustic models and performing a linear combination.

In another example, the acoustic model generating unit 150 may generate twenty (20) acoustic models which correspond with the respective twenty (20) set positions according to the procedures as described above.

Figure 4:
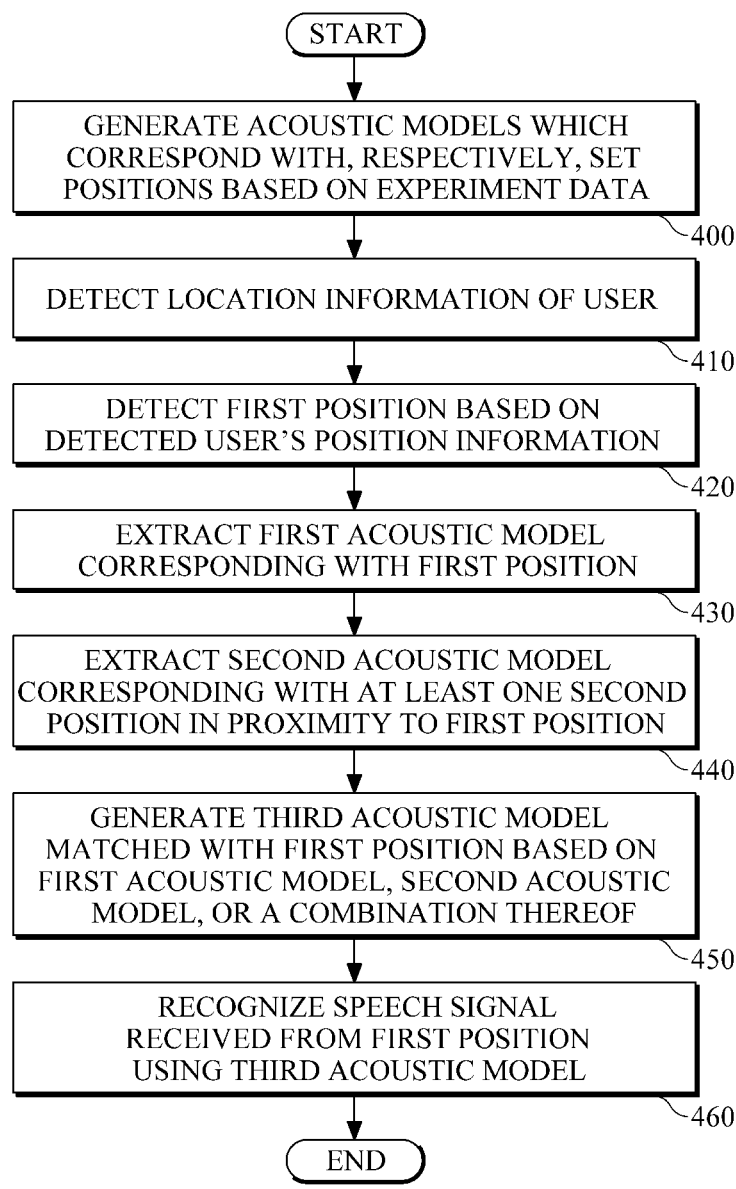
FIG. 4 is a flowchart illustrating an example of an acoustic processing method.

FIG. 4 illustrates a flowchart of an example of an acoustic processing method.

Referring to the example illustrated in FIG. 4, an acoustic processing apparatus generates acoustic models which correspond with, respectively, positions set in a speech recognition target area based on experiment data obtained at each of the set positions (400). The acoustic processing apparatus detects position information of a user (410). The acoustic processing apparatus detects a first position based on the detected user's position information (420). The first position refers to a position which corresponds with the user's position information among the set positions. The acoustic processing apparatus extracts a first acoustic model that corresponds with the first position from among the positions set in the speech recognition target area (430). The acoustic processing apparatus extracts at least one second acoustic model that corresponds with, respectively, at least one second position in proximity to the first position (440).

The acoustic processing apparatus generates a third acoustic model that corresponds with the first position based on the first acoustic model, the second acoustic model, or a combination thereof (450). For example, the acoustic processing apparatus may generate the third acoustic model by assigning a weight to the first acoustic model, the second acoustic model, or a combination thereof and performing a linear combination. The acoustic processing apparatus recognizes an acoustic signal received from the first position using the third acoustic model (460).

Program instructions to perform a method described herein, or one or more operations thereof, may be recorded, stored, or fixed in one or more computer-readable storage media. The program instructions may be implemented by a computer. For example, the computer may cause a processor to execute the program instructions. The media may include, alone or in combination with the program instructions, data files, data structures, and the like. Examples of computer-readable media include magnetic media, such as hard disks, floppy disks, and magnetic tape; optical media such as CD ROM disks and DVDs; magneto-optical media, such as optical disks; and hardware devices that are specially configured to store and perform program instructions, such as read-only memory (ROM), random access memory (RAM), flash memory, and the like. Examples of program instructions include machine code, such as produced by a compiler, and files containing higher level code that may be executed by the computer using an interpreter. The program instructions, that is, software, may be distributed over network coupled computer systems so that the software is stored and executed in a distributed fashion. For example, the software and data may be stored by one or more computer readable recording mediums. Also, functional programs, codes, and code segments for accomplishing the example embodiments disclosed herein can be easily construed by programmers skilled in the art to which the embodiments pertain based on and using the flow diagrams and block diagrams of the figures and their corresponding descriptions as provided herein. Also, the described unit to perform an operation or a method may be hardware, software, or some combination of hardware and software. For example, the unit may be a software package running on a computer or the computer on which that software is running. A number of examples have been described above. Nevertheless, it should be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A hardware acoustic processing apparatus comprising:
a first extracting unit configured to extract a first acoustic model that corresponds with a first position among positions set in a speech recognition target area;
a second extracting unit configured to extract at least one second acoustic model that corresponds with, respectively, at least one second position in proximity to the first position; and
an acoustic model generating unit configured to generate a third acoustic model based on the first position of the first acoustic model or a combination of the first position of the first acoustic model and the second acoustic model.

2. The acoustic processing apparatus of claim 1, wherein the acoustic model generating unit generates the third acoustic model by assigning a weight to the first acoustic model, the second acoustic model, or a combination thereof and performing a linear combination.

3. The acoustic processing apparatus of claim 1, wherein the acoustic model generating unit generates acoustic models which correspond with the respective set positions based on experiment data obtained from each of the set positions.

4. The acoustic processing apparatus of claim 1, further comprising:
a position detecting unit configured to detect position information, and to detect the first position based on the detected position information.

5. The acoustic processing apparatus of claim 1, further comprising:
a speech recognition unit configured to recognize an acoustic signal received from the first position based on the third acoustic model.

6. The acoustic processing apparatus of claim 1, wherein the acoustic model generating unit generates an acoustic model based on a maximum likelihood (ML) scheme.

7. The acoustic processing apparatus of claim 1, further comprising a position setting unit that sets positions in the speech recognition target area.

8. The acoustic processing apparatus of claim 1, wherein each acoustic model represents at least one characteristic of a speech signal.

9. The acoustic processing apparatus of claim 1, wherein the acoustic model generating unit uses a cluster adaptive training scheme to generate the third acoustic model.

10. The acoustic processing apparatus of claim 1, wherein the third acoustic model is generated in real time or in advance.

11. The acoustic processing apparatus of claim 1, wherein the third acoustic model corresponds with the first position.

12. The acoustic processing apparatus of claim 1, wherein the third acoustic model reflects environmental characteristics of the first position based on the first acoustic model.

13. An acoustic processing method of an acoustic processing apparatus based on position information, the acoustic processing method comprising:
extracting a first acoustic model that corresponds with a first position among positions set in a speech recognition target area;
extracting at least one second acoustic model that corresponds with, respectively, at least one second position in proximity to the first position; and
generating a third acoustic model based on the first position of the first acoustic model, or a combination of the first position of the first acoustic model and the second acoustic model.

14. The acoustic processing method of claim 13, wherein the generating of the third acoustic model comprises generating the third acoustic model based on assigning a weight to the first acoustic model, the second acoustic model, or a combination thereof and performing a linear combination.

15. The acoustic processing method of claim 13, further comprising:
generating acoustic models which correspond with the respective set positions based on experiment data obtained from each of the set positions.

16. The acoustic processing method of claim 13, further comprising:
extracting position information; and
extracting the first position based on the detected position information.

17. The acoustic processing method of claim 13, further comprising:
recognizing an acoustic signal received from the first position based on the third acoustic model.

18. The acoustic processing method of claim 13, wherein the generating of the third acoustic model uses a training scheme.

19. An acoustic processing method, the acoustic processing method comprising:
setting positions in a speech recognition target area;
extracting at least one second acoustic model corresponding to at least one second position in proximity to a first position;
generating a third acoustic model based on weights assigned to the second positions; and
recognizing an acoustic signal received from the first position of a first acoustic model using the third acoustic model.

20. A hardware acoustic processing apparatus comprising:
a first extracting unit configured to extract a first acoustic model that corresponds with position information among positions set in a speech recognition target area;
a second extracting unit configured to extract at least one second acoustic model that corresponds with, respectively, at least one second position in proximity to the position information; and
an acoustic model generating unit configured to generate a third acoustic model based on the position information of the first acoustic model.

* * * * *